United States Patent
Baker et al.

(10) Patent No.: US 7,328,837 B2
(45) Date of Patent: Feb. 12, 2008

(54) METHOD OF ATTACHING AN RF ID TAG TO A HOSE AND TRACKING SYSTEM

(75) Inventors: Kenneth D. Baker, Ambler, PA (US); David Greer, Perkasie, PA (US); Michael C. Needling, Norristown, PA (US); Gary Rozenblat, Sherman Oaks, CA (US); George Younan, Porter Ranch, CA (US)

(73) Assignee: NewAge Industries, Inc., Southhampton, PA (US)

( * ) Notice: Subject to any disclaimer, the term of this patent is extended or adjusted under 35 U.S.C. 154(b) by 0 days.

(21) Appl. No.: 11/493,483

(22) Filed: Jul. 26, 2006

(65) Prior Publication Data

US 2007/0029382 A1    Feb. 8, 2007

Related U.S. Application Data

(63) Continuation of application No. 11/070,702, filed on Mar. 2, 2005, now Pat. No. 7,195,149.

(60) Provisional application No. 60/549,388, filed on Mar. 2, 2004.

(51) Int. Cl.
    *G06F 17/00* (2006.01)
(52) U.S. Cl. ............... 235/375; 235/451; 235/376
(58) Field of Classification Search ......... 235/375; 264/311; 700/108
    See application file for complete search history.

(56) References Cited

U.S. PATENT DOCUMENTS

| 4,294,792 A | * | 10/1981 | Arons et al. ............... 264/311 |
| 5,270,717 A | | 12/1993 | Schuermann |
| 5,995,006 A | | 11/1999 | Walsh |
| 6,660,396 B1 | | 12/2003 | Warburton-Pitt |

(Continued)

FOREIGN PATENT DOCUMENTS

JP    2005-143997    6/2005

(Continued)

*Primary Examiner*—Michael G. Lee
*Assistant Examiner*—Kristy A. Haupt
(74) *Attorney, Agent, or Firm*—Volpe and Koenig, PC

(57) ABSTRACT

A hose tracking system having a hose assembly with an attached RF ID tag imbedded therein during manufacture, molded thereon or permanently attached. The RF ID tag is coded with an identification specific to the particular hose assembly. An RF ID tag reader is provided, which is usable by a user to obtain the identification from the RF ID tag on the hose, preferably after it is installed at the user facility. The RF ID tag reader includes a user input for at least one trackable event and is at least one of connectable to a computer network or compatible for uploading the identification and any user input to a network accessible device. A network accessible hose database is provided, having hose-related information. The network accessible hose database provides access to a user to obtain the hose-related information based on the identification from the RF ID tag and receives and stores data related to the at least one trackable event.

7 Claims, 3 Drawing Sheets

U.S. PATENT DOCUMENTS

| | | | |
|---|---|---|---|
| 6,994,253 B2* | 2/2006 | Miller et al. | 235/385 |
| 7,195,149 B2* | 3/2007 | Baker et al. | 235/375 |
| 2002/0060629 A1* | 5/2002 | Pfeiffer et al. | 340/572.8 |
| 2002/0188259 A1* | 12/2002 | Hickle et al. | 604/189 |
| 2003/0158795 A1* | 8/2003 | Markham et al. | 705/28 |
| 2003/0173408 A1* | 9/2003 | Mosher et al. | 235/492 |
| 2003/0233161 A1* | 12/2003 | Cheng et al. | 700/108 |
| 2004/0092991 A1* | 5/2004 | Deng | 606/170 |

FOREIGN PATENT DOCUMENTS

JP    2005143997 A  *  6/2005

* cited by examiner

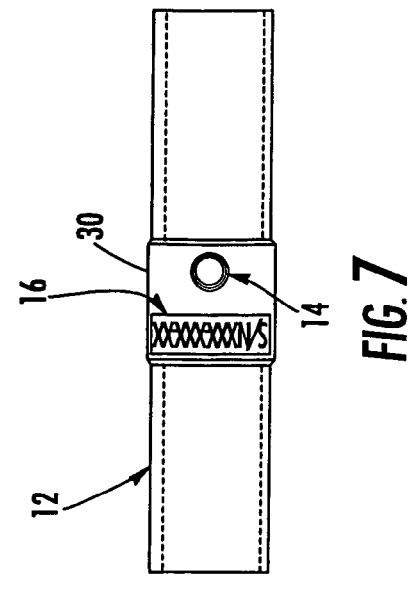
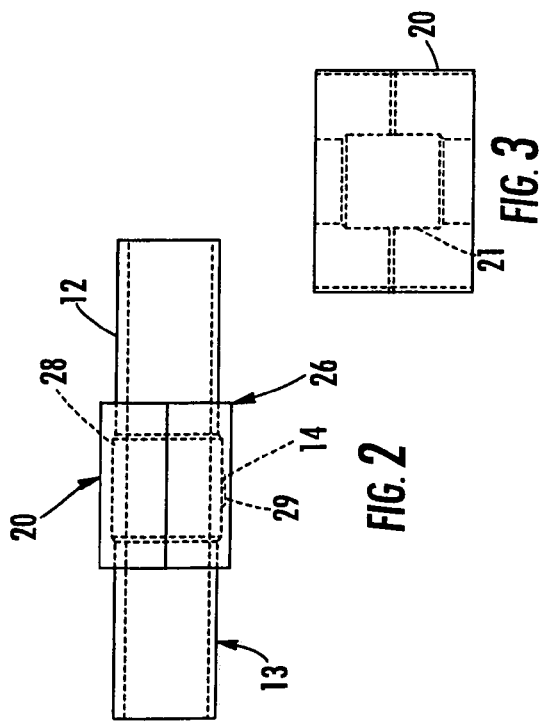

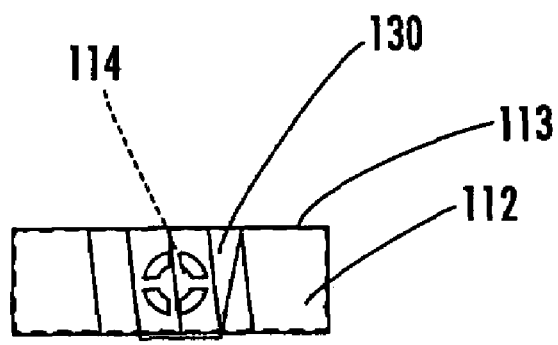
FIG. 8
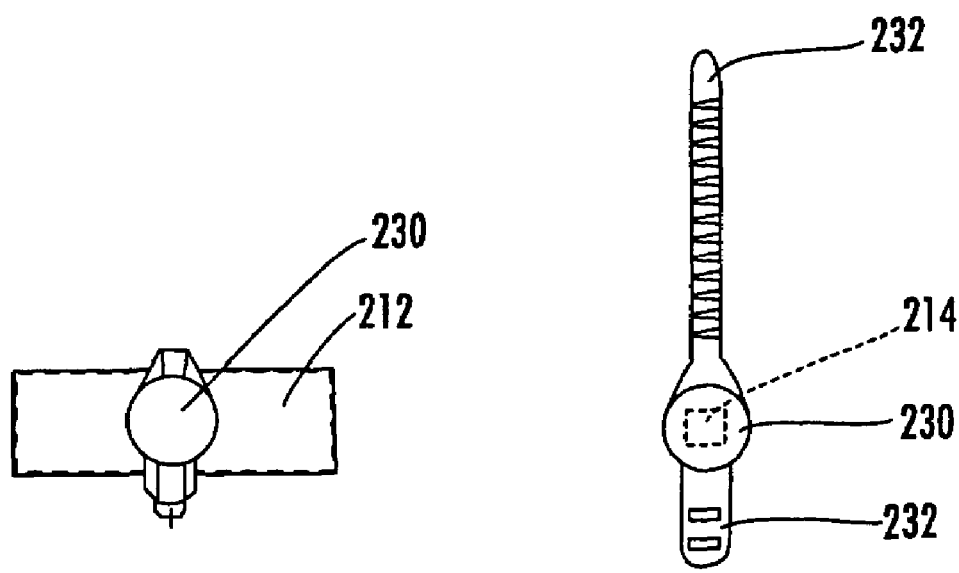
FIG. 9
FIG. 10

METHOD OF ATTACHING AN RF ID TAG TO A HOSE AND TRACKING SYSTEM

CROSS REFERENCE TO RELATED APPLICATION(S)

This application is a continuation of U.S. patent application Ser. No. 11/070,702, filed Mar. 2, 2005, now U.S. Pat. No. 7,195,149 which claims the benefit of U.S. Provisional Application No. 60/549,388, filed Mar. 2, 2004, which is incorporated by reference herein as if fully set forth.

BACKGROUND

The present invention relates to a tracking system, and in particular a tracking system which utilizes a radio frequency identification tag (RF ID tag) in order to identify and track a hose assembly, provide access to supporting documents and specifications for the hose assembly, and provide customer access to data related to the hose assembly, the use and location of the hose assembly, as well as cataloguing event-specific data related to the hose to allow the hose life to be predicted and a replacement to be ordered within a predetermined time period, preferably using an internet connection.

Systems are known for permanently associating identifying indicia with a previously manufactured product. This is typically done in order to provide positive identification of the product. Such indicia may be visually readable by a user or machine-readable, such as via a magnetic strip reader or an optical or magnetic bar code. This type of identification has been done in accordance with specific industry requirements, where it is often required to specifically identify sections of tubing or hose assemblies that are utilized during different manufacturing steps. Permanent placement of indicia on these tubing sections or hose assemblies prevents inadvertent loss of the identification and therefore the ability to identify the article throughout its useable life.

In one known system, silicone sheet material having embedded therein a quantity of thermally activateable crosslinking catalyst is secured to the product. An indicia-containing element is placed on the silicone sheet material and is then covered by another piece of the same type of silicone sheet material. Heat is then applied to the assembly, causing the pieces of silicone material to crosslink together and encapsulate the indicia-containing element. While this type of arrangement can be used, it has a high cost associated with applying the multiple layers of material, and a better system for attaching indicia to a tube or hose assembly for tracking purposes is required.

RF ID tags have also been known and have been adapted to various uses, such as inventory control and theft protection of items. The heart of an RF ID system is an information-carrying tag that functions in response to a coded RF signal received from a mobile reader or base station. The tag reflects the incident RF carrier back to the RF ID tag reader or base station and the information transferred as the reflected signal is modulated by the tag according to its programmed information protocol. RF ID tags may be active, in which a power source is provided, or passive, in which the energy for the reflected signal is derived from the RF signal from the base station or RF ID tag reader used to interrogate the tag. The RF ID tags can be programmed or encoded with specific information, such as an individual identification number for a product, such as a serial number, and/or additional product information, depending upon the complexity of the RF ID tag. However, in most general applications, a simple identification number is sufficient.

In many industries, such as pharmaceutical, biotech and chemical industries, it is difficult to obtain good data with respect to the life of hose assemblies in view of the many processing requirements required by various applications. Accordingly, it has been difficult to predict the expected life of a hose assembly, depending upon the particular application, and oftentimes a hose assembly for a particular application is discovered to be no longer serviceable when it fails in use, resulting in downtime for the equipment while a new replacement part is procured, as well as loss of product being processed and/or contamination. The life of the hose assembly can be affected by different factors, such as processing times, number of batches of material processed, as well as cleaning cycles. However, no efficient means exists to track these factors, and tracking becomes even more difficult when no specific identification is associated with the hose assemblies, either through loss or labeling that cannot be read due to use and/or repeated cleanings.

Accordingly, it would be desirable to provide a better and more efficient means for attaching indicia to a hose assembly as well as the ability to track predetermined events with respect to the hose assembly, as well as using the identification to obtain hose-related data, specifications and certifications as required from a manufacturer. It would also be desirable to provide an easier and more efficient system for tracking hose life so that replacement hoses can be ordered in a timely manner prior to failure of the hose and within a projected life expectancy.

SUMMARY

Briefly stated, the present invention provides a hose tracking system. The system includes a hose assembly with an attached RF ID tag imbedded therein during manufacture, molded thereon, or permanently attached. The RF ID tag is coded with an identification specific to the particular hose assembly. An RF ID tag reader is provided that is usable by a user to obtain the identification from the RF ID tag on the hose, preferably after it is installed at the user facility. The RF ID tag reader includes a user input for at least one trackable event, which can be, for example, an installation date, cleaning date or dates, and/or number of batches of material transferred through the hose assembly. The RF ID tag reader is at least one of connectable to a computer network or compatible for uploading the identification and any user input to a network accessible device, for example, a PC. A network accessible hose database is provided, having hose-related information, including at least one of a manufacturing date, a replacement date, a batch number, a lot number, material specifications, material lot number, certificates of compliance, size specifications, fitting specifications, description, drawings, customer data, batch process description, cleaning operations and customer application associated with the identification for the hose assembly. The word "and", as recited in the preceding sentence, indicates that one, all, or any combination of the listed items of hose-related information may be included in the network accessible database. The network accessible hose database provides access to a user to obtain the hose-related information based on the identification from the RF ID tag and receives and stores data related to the at least one trackable event, preferably by uploading the data from the RF ID tag reader itself, if it is connectable to the network, or from the information uploaded from the RF ID tag reader to the network access device.

In another aspect, the invention provides a trackable hose assembly, which includes a hose having two ends. A fitting is preferably located on each end of the hose. An RF ID tag programmed with a serial number and one or more selectable or user defined parameters, such as cleaning processes or user batch process information, is encapsulated in a molded sleeve formed on an exterior surface of the hose. The molded sleeve is preferably made from a clear molding compound, such as silicone, and is formed via liquid injection molding and cured in place on the hose.

In another aspect, the invention provides a method of tracking a hose assembly using a tracking system for obtaining hose data. The method includes: affixing an RF ID tag encoded with an identification on the hose assembly; providing hose information relating to the hose assembly to a hose database correlated to the identification; a user reading the RF ID tag with an RF ID tag reader; the user inputting at least one trackable event regarding the hose assembly into the RF ID tag reader; uploading data from the RF ID tag reader to a network accessible device or connecting the RF ID tag reader to a network; accessing the hose database; retrieving data relating to the hose assembly from the hose database using the identification; and uploading data on the at least one trackable event to a hose history database to build the hose history database.

The invention also provides a method of affixing an RF ID tag to a hose. The method preferably includes: placing an RF ID tag programmed with an identification on one of an outer diameter of a hose or inside a mold cavity of a mold adapted to be placed around the hose; placing the mold around the hose and the RF ID tag located in proximity to an outer surface of the hose, the mold including openings sized to allow the hose to pass therethrough and forming an annular chamber between an outer surface of the hose and an inner surface of the mold; injecting a liquid molding compound into the mold; curing the liquid injection molding compound; and removing the hose from the mold.

BRIEF DESCRIPTION OF THE DRAWINGS

The foregoing Summary and the following detailed description will be better understood when read in conjunction with the following drawings, which illustrate preferred embodiments of the invention. In the drawings:

FIG. 2 is a side view of a hose assembly in accordance with the present invention shown in the process of having the RF ID tag molded thereon.

FIG. 3 is a plan view of the top mold half shown in FIG. 2.

FIG. 4 is side view of the top mold half shown in FIG. 3.

FIG. 5 is a plan view looking downwardly into the mold cavity of the bottom mold half.

FIG. 6 is a side view of the bottom mold half.

FIG. 7 is a side view of a hose assembly having a molded-on RF ID tag, as well as molded on readable indicia in accordance with the invention.

FIG. 8 is a side view of a hose assembly having a field installable RF ID tag encased in silicone tape in accordance with a first alternative preferred embodiment of the present invention.

FIG. 9 is a side view of a hose assembly having a field installable RF ID tag enclosed in an encapsulating strap in accordance with a second alternative preferred embodiment of the present invention.

FIG. 10 is a plan view of the encapsulating strap shown in FIG. 9.

DETAILED DESCRIPTION OF THE PREFERRED EMBODIMENT(S)

Figure 1:
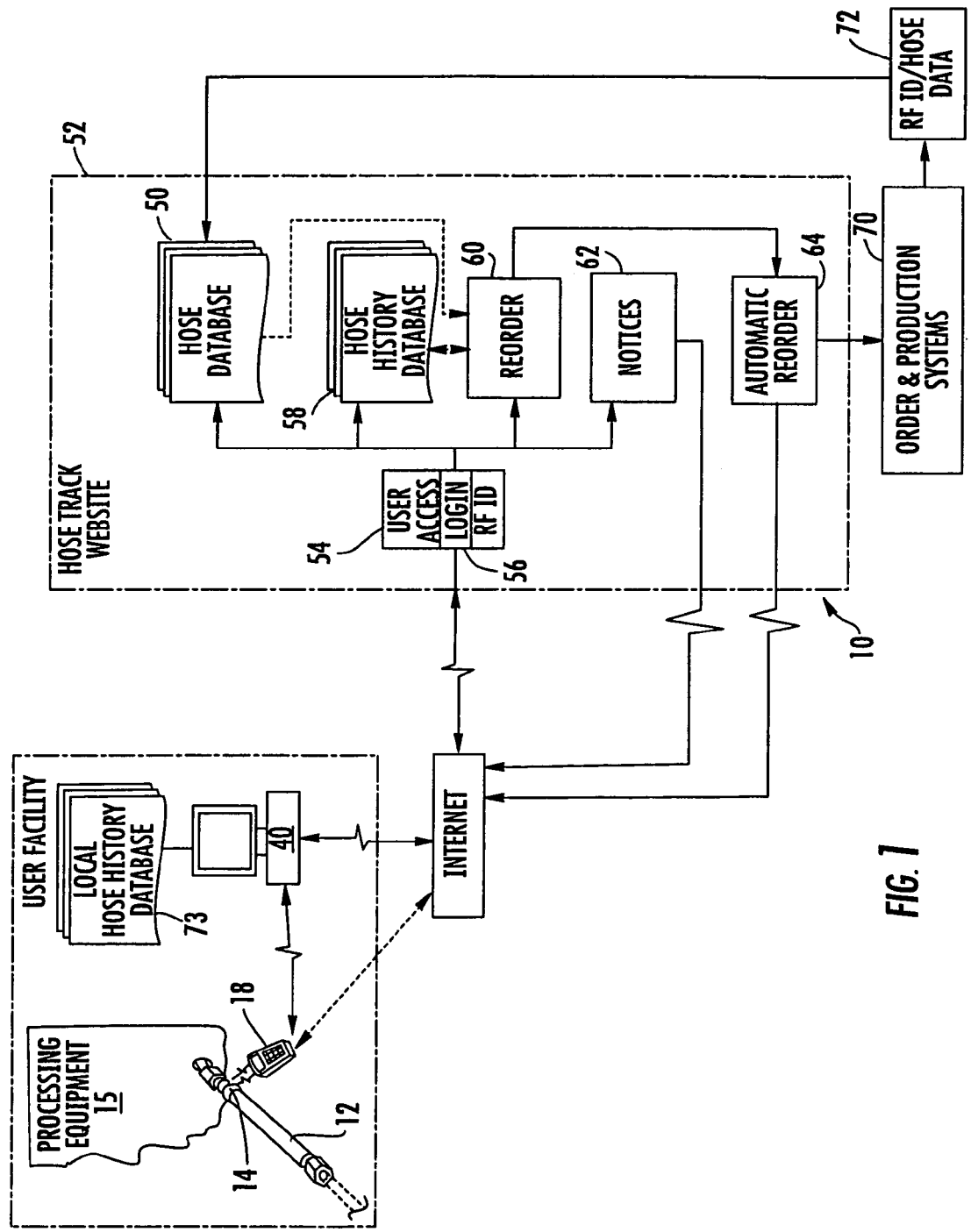
FIG. 1 is a schematic view showing a hose tracking system in accordance with a preferred embodiment of the present invention.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the hose assembly and/or tools shown and designated parts thereof. The terminology includes the words above specifically mentioned, derivatives thereof and words of similar import.

Referring now to FIG. 1, a hose tracking system 10 in accordance with the present invention is shown. The hose tracking system 10 is used in conjunction with a hose assembly 12 with an attached RF ID tag 14 embedded therein during manufacture or molded thereon. The RF ID tag 14 is of the type generally known in the art and may be an active or passive RF ID tag. Preferably, the RF ID tag 14 is encoded with at least an identification or serial number for the hose, which is assigned by the manufacturer in order to allow each hose assembly 12 that has been manufactured to be tracked individually. The RF ID tag 14 is preferably able to withstand repeated heat cycles of up to 200° C., typical of hose cleaning operations through steam cleaning or autoclaving.

Preferably, the RF ID tag 14 is attached to the hose assembly 12 or a hose or other article to be tracked during manufacture, or is molded thereon in a permanent manner so that it cannot be inadvertently removed or tampered with.

In the preferred application for the hose tracking system 10, the RF ID tag 14 is attached to the hose by a liquid injection molding process, as shown in FIG. 2. Upper and lower mold halves 20 and 26, respectively, are placed on either side of an outer surface 13 of the hose 12. The RF ID tag 14 is located in proximity to the outer surface of the hose 12, and the mold, formed from the upper and lower mold halves 20, 26 includes openings located on the left and right sides to allow the hose 12 to pass therethrough, and forms an annular chamber 28 between an outer surface 13 of the hose 12 and an inner surface 21, 27 of the upper and lower mold halves 20, 26. Preferably, a cavity 29 for receiving the RF ID tag 14 is formed in the mold, and in the preferred embodiment is formed in the lower mold half 26, as shown in FIGS. 5 and 6. The RF ID tag 14 can be placed on the outer surface 13 of the hose 12 in a position which corresponds to the position of the cavity 29, or alternatively can be placed in the cavity 29 prior to placing the mold halves 20, 26 around the hose 12. Once the mold is clamped in position, a liquid molding compound is injected into the mold 20, 26. The liquid molding compound, which is preferably a clear liquid silicone rubber, is then cured. Other suitable high temperature and moisture resistant materials can optionally be utilized.

After the molding compound is cured, the mold is removed from the hose 12. In order to enhance the cure rate, in a preferred embodiment, the mold is preheated to a curing temperature of the molding compound prior to or after injecting the liquid molding compound into the mold. This can be a temperature of approximately 250-290° F. for low temperature curing silicone rubber compounds. For example, the mold halves 20, 26 can be heated to 250° F. if a liquid silicone rubber is utilized. Other temperatures could be used for other suitable molding materials.

As shown in FIG. 7, this results in a molded-on band 30 formed on the hose 12, which encapsulates the RF ID tag 14. In a preferred embodiment, a label 16 with user-readable indicia can be placed in proximity to the outer surface 13 of the hose in the area of the mold cavity, so that the user-readable indicia is affixed to the hose 12 with the RF ID tag 14. The label 16 can be on the same side of the hose as the RF ID tag 14, as shown in FIG. 7, or in another preferred embodiment, the label 16 can be located on an opposite side of the hose 12 from the RF ID tag 14. By using a clear liquid silicone as the molding compound, the user-readable indicia remains visible even after repeated cleanings of the hose assembly 12. It is also possible to encapsulate other types of machine-readable indicia, such as a bar code or magnetic strip.

While it is preferred that the RF ID tag 14 is attached in a separate operation, the RF ID tag 14 could also be molded into the hose itself, especially in the case of a multi-layer hose, where the RF ID tag 14 can be positioned beneath an outermost layer of material or jacket on the hose and encapsulated thereon. Alternatively, the RF ID tag 14 could be attached by other means.

Referring to FIG. 8, a hose assembly 112 according to a first alternative preferred embodiment of the present invention is shown. An RF ID tag 114 is encased on a surface 113 of the hose assembly 112 by a layer of tape 130. The tape 130 is preferably a self-adhering tape such as a self fusing silicone or adhesive tape. During installation, the RF ID tag is placed on the surface 113 of the hose assembly 112 and the tape 130 is wrapped once or more times around the hose assembly 112 to secure the tag 114 to the hose assembly 112.

Referring to FIGS. 9 and 10, a hose assembly 212 according to a second alternative preferred embodiment of the present invention is shown. A strap 230 contains an RF ID tag 214 encapsulated therein. The strap 230 includes interlocking portions 232 which can be connected for permanently or removably connecting the strap 230 to the hose assembly 212. Preferably an adhesive, such as an RTV silicone sealant, is applied to the strap 230 to provide a permanent bond between the strap 230 and the hose assembly 212. Alternatively, a heat shrinkable polymer band or other pre-formed band that can be bonded or otherwise affixed to a hose to connect an RFID tag. For example, a pre-formed silicone band could be installed on a hose over the RF ID tag 14 and then be sealed in place using an RTV silicon sealant. These alternative embodiments may be suitable in certain applications because they provide a field installable method for permanently attaching an RF ID tag. However, for hose assemblies that must be steam cleaned or autoclaved, the molded-on system described above and shown in FIG. 7 is preferred due to the seal of the liquid injection molded band 30 against the hose 12 preventing the ingress of contaminants or cleaning agents.

Referring again to FIG. 1, the hose assembly 12 is preferably installed at a user facility in connection with certain processing equipment 15. This can be used for pharmaceutical and/or biochemical processing of drugs and/or other high purity requiring compounds and/or chemical processing facilities in which caustic materials are carried by the hose assembly 12.

An RF ID tag reader 18 is provided, which is adapted to be used by a user to obtain the identification and stored information from the RF ID tag 14. Preferably, the RF ID tag reader 18 also includes a user input, preferably in the form of a keyboard, for tracking at least one trackable event. The trackable event can be related to an installation date of the hose, or it could also include a series of trackable events, such as how many times a hose assembly 12 is cleaned in place using chemical cleaners or steam, and/or is cleaned through removal of the hose and autoclaving the hose assembly 12. These trackable events in the context of the hose tracking system 10 all relate to the wear life of the hose assembly 12. Through the tracking of these events, it is possible to provide a more accurate method of predicting hose life and obtaining replacement hose assemblies prior to failure. The RF ID tag reader 18 is at least one of connectable to a computer network, for example, through a wireless connection as in PDAs or other wireless network access devices (shown as a dashed line in FIG. 1), or is compatible for uploading the identification from the RF ID tag 14 and the user input to a network accessible device, for example, a PC 40 as shown in FIG. 1. Such connections which preferably provide access to the internet, either through a wireless connection and/or via a modem, DSL or T1 cable, are generally known and accordingly, a further description is not necessary for those of ordinary skill in this field.

Preferably, a local hose track history database 73 is provided on the PC 40 in which data from the RF ID tag reader 18 can be stored. The user can make an internet connection to a network accessible hose database 50, preferably located in a website 52 operated by the hose assembly manufacturer or any other suitable tracking organization. The network accessible hose database 50 includes hose-related information, including but not limited to manufacturing date, replacement date batch number, lot number, material specifications, material lot number, certificates of compliance, size specification with respect to both the length and diameter of the hose, fitting specifications, including material and size, a description of the hose assembly, drawings, batch process description, cleaning operations and any customer-related data with respect to the intended use or application of the hose assembly. This information is all provided in the hose database 50 and is associated or correlated with the identification originally provided or encoded in the RF ID tag 14 for the hose assembly 12.

The network accessible hose database 50 provides access to a user, preferably through a user access system 54, wherein a user logs in using a specific user ID at a log in screen 56. During the log in process, or thereafter, data on the at least one trackable event is uploaded from the RF ID tag reader 18 or the network access device 40 and is received and stored in the local hose track database 73 and can then optionally be stored in the hose track website 52. This is preferably done based on the RF ID for the particular hose assembly 12 in question, or can be done for a series of different hose assemblies 12, each having its own unique RF ID, from the data which has been collected by the user at the user facility. In the preferred embodiment, the data related to the at least one trackable event is stored in a hose history database 58, which is used to store data on one or more trackable events, which in the preferred embodiment are related to hose life and hose wear. Additionally, preferably a reorder system 60 is provided, which allows the user to reorder a new hose assembly based on the RF ID tag 14 identification. This is preferably used in connection with the RF ID and the hose database 50, so that all of the specifications for a particular hose assembly 12 can be obtained from the hose database 50 to streamline the reorder process. Additionally, the user database 73 preferably interfaces with the hose history database 58, so that order patterns in comparison to the series of trackable events stored in the hose history database 58 can be compared and/or the trackable events can be used in connection with generating automatic reorders via an automatic notice system 62, which interfaces with at least one of the hose database 50 and the hose history database 58 regarding an expected replacement life of the hose assembly 12 and generates an electronic notice to the user prior to an expiration of the hose assembly replacement life based on the hose history database 58. This notice is preferably sent via e-mail or may be generated internally to send a reminder by mail or via other means.

Additionally, depending upon a user's needs, an automatic reorder system 64 is provided, which generates an automatic reorder based on the hose database 50, when the expected life of the hose assembly 12 has almost expired. This can be set up in advance to generate an automatic reorder using the hose specifications from the hose database 50 at a predetermined time period, for example, 30 days, prior to the expected expiration life of the hose assembly 12. An automatic reorder notice can be sent via e-mail to the user over the internet, or it can be sent by other means. Additionally, the automatic reorder system 64 communicates, preferably electronically, directly with the manufacturer's order and productions systems 70, so that manufacture of the new hose assembly 12 is completed and the new hose assembly shipped prior to expiration of the expected life of an installed hose assembly 12. The manufacturer then updates the hose database 50, either directly or through a network connection with the RF ID and hose data 72 for the new hose assembly.

In addition to reorders, notices can be sent to a user regarding at least one of maintenance information and/or recall information for the hose assembly 12, which is accessible based on the RF ID tag identification when a user logs in using the user access connection, or which can be automatically generated and e-mailed to a user.

The system 10 provides 24-hour access to a user of all information regarding any specific hose assembly 12 via the internet and the unique hose assembly identification provided by the RF ID tag 14. The system 10 also provides an easy and convenient way for a user to reorder an existing hose, based on an existing specification in the hose database 50 for the particular user application.

The system 10 also provides a means for predicting the life of the hose by building the hose history database 58, which preferably includes data related to one or more hose life related trackable events. In the case of a hose assembly 12 used in ultrapure material processing, such as pharmaceutical, biotech, cosmetic and/or food processing to track wear related events, these events can be the installation date of the hose, cleaning of the hose, which often involves caustic and/or material degrading processes, and the number of batches of material processed so that after a predictable number of events, replacement of the hose assembly 12 can be accomplished prior to degradation or failure. By developing the hose history database 58 in conjunction with the user, the hose track system 10 provides for automatic notices regarding the expected expiration life of the hose and can even provide automatic reordering of the hose, so that a user does not face downtime when a hose assembly 12 fails in use or is no longer serviceable and a replacement must be obtained on an expedited basis.

Additionally, for processing equipment used to produce FDA-approved or tested products, the system provides a means for tracking items which can degrade during use and replacing them prior to any failure or contamination due to degradation.

By providing automatic contact to the customer that hose assembly 12 needs replacement and/or by providing an option for a customer to have automatic reordering carried out based upon the hose history database 58, the present invention streamlines the ordering and replacement process and also avoids downtime associated with hose assembly failures which could have been easily predicted.

While the hose track system 10 is preferably for use in connection with an RF ID tag 14 located on a hose assembly, which can be read regardless of any degradation that occurs to the molded-on band 30 used to attach the RF ID tag 14 to the hose assembly 12, it could also be used in connection with other types of machine-readable ID information, for example, bar codes and/or magnetic strips.

In a method according to the invention, the hose track system 10 is used to track a hose assembly 12 and for obtaining hose data related to, for example, the manufacturing date, batch number, lot number, material specifications, material lot number, certificates of compliance, size specifications, fitting specifications, description, customer data and/or customer application associated with a particular unique identification for the hose assembly 12. The RF ID tag 14 encoded with the particular identification for a hose assembly 14 is affixed to the hose assembly 14, preferably through a liquid injection molding process, so that it becomes permanently attached to the hose. The hose information related to the hose assembly 12 is loaded into a hose database 50 and correlated to the identification provide by the RF ID tag 14 for the particular hose. This can be done by a manufacturer or another service which is subscribed to by both the manufacturer and the user. In order to utilize this system, a user reads the RF ID tag 14 utilizing an RF ID tag reader 18. The user also inputs at least one trackable event regarding the hose assembly 12 into the RF ID tag reader 18. The data from the RF ID tag reader 18, specifically the identification as well as the user input regarding the at least one trackable event, are uploaded from the RF ID tag reader 18 to a network accessible device or the RF ID reader 18 itself is connected to the network, for example, through a wireless or plug connection. The user can then access the hose database 50 and retrieve data relating to the hose assembly 12 using the specific identification provided by the RF ID tag 14 for the hose assembly 12. Additionally, data on the at least one trackable event is uploaded to a hose history database 58 in order to build the hose history database 58. Preferably, a user can log in to the hose tracking system 10 on a periodic basis and analyze data regarding a series of trackable events, for example, the number of times a hose assembly 12 was cleaned, the number of batches of material that were processed through the hose assembly 12 and/or any other periodic trackable events that have an effect on hose life. Utilizing the data in the hose history database 58, an expected hose life can be determined based on at least one of the hose history database 58 and the customer reorder data, which is received in the reordering system 60. Utilizing this data, a user can determine a hose life expectancy based on the hose history database 58.

An automatic reorder system 64 interfaces with the hose database 50 and electronically notifies the user to reorder a particular hose assembly 12 for a specific application based upon an expiration of the determined hose life expectancy. This can also be done to automatically reorder the hose assembly 12 prior to an expiration of a hose life expectancy.

While the preferred embodiment of the invention is directed to tracking a hose life expectancy and allowing automatic reordering as well as access to all the hose data using the hose tracking system 10, this could be used in other applications.

What is claimed is:

1. A trackable hose assembly, comprising:
   a hose having two ends;
   a fitting located on each hose end;
   an RF ID tag programmed with at least one of a hose serial number, lot number, manufacturing date, replacement date and customer data encapsulated in a molded sleeve formed on an exterior surface of the hose, and
   user readable indicia encapsulated in the molded sleeve,
   wherein the molded sleeve is a cured liquid injection molded sleeve formed from a clear molding compound.

2. The trackable hose assembly of claim 1, wherein the clear molding compound is a silicone rubber.

3. A method of tracking a hose assembly using a tracking system for obtaining hose data, comprising:
   affixing an RF ID tag encoded with an identification on the hose assembly;
   providing hose information relating to the hose assembly to a hose database correlated to the identification;
   installing the hose assembly in connection with a piece of processing equipment;
   a user reading the RF ID tag with an RF ID tag reader;
   the user inputting at least one trackable event regarding the hose assembly into the RF ID tag reader while the hose assembly is in service in connection with the piece of processing equipment;
   uploading data from the RF ID tag reader to a network accessible device or connecting the RF ID tag reader to a network;
   accessing the hose database;
   retrieving data relating to the hose assembly from the hose database using the identification; and
   uploading data on the at least one trackable event to a hose history database to build the hose history database.

4. The method of claim 3, further comprising:
   a user using the internet and logging into a host web site to access the hose database; and
   the uploading of the data relating to the at least one trackable event regarding the hose assembly includes uploading data on a series of trackable events.

5. The method of claim 3, wherein the trackable event is a hose assembly wear related event.

6. The method of claim 3, further comprising:
   reordering a new hose assembly based on the hose database and the hose identification.

7. The method of claim 3, further comprising:
   automatically notifying the user regarding at least one of a maintenance and a recall.

* * * * *